United States Patent
Brown et al.

(10) Patent No.: US 7,363,882 B2
(45) Date of Patent: Apr. 29, 2008

(54) CONDENSATION REMOVAL FOR USE WITH A DRAFT INDUCER

(75) Inventors: Fred A. Brown, Coronado, CA (US); Philip J. Bowen, San Diego, CA (US); Jeffrey E. From, San Diego, CA (US)

(73) Assignee: Comair Rotron, Inc., San Diego, CA (US)

( * ) Notice: Subject to any disclaimer, the term of this patent is extended or adjusted under 35 U.S.C. 154(b) by 0 days.

(21) Appl. No.: 11/223,821

(22) Filed: Sep. 9, 2005

(65) Prior Publication Data

US 2006/0185620 A1     Aug. 24, 2006

Related U.S. Application Data

(63) Continuation-in-part of application No. 10/847,646, filed on May 17, 2004, now abandoned, which is a continuation-in-part of application No. 10/847,207, filed on May 17, 2004, and a continuation-in-part of application No. 10/655,534, filed on Sep. 4, 2003, now Pat. No. 7,052,271.

(60) Provisional application No. 60/409,142, filed on Sep. 9, 2002, provisional application No. 60/499,844, filed on Sep. 3, 2003.

(51) Int. Cl.
F22B 5/04 (2006.01)

(52) U.S. Cl. ........................... 122/38; 122/14.2

(58) Field of Classification Search .............. 122/14.1, 122/14.2, 38; 431/20; 126/80; 60/685, 60/688, 689; 417/423.14, 423.1
See application file for complete search history.

(56) References Cited

U.S. PATENT DOCUMENTS

| | | | |
|---|---|---|---|
| 4,537,178 A | 8/1985 | Hwang et al. | 126/110 R |
| 4,603,680 A | 8/1986 | Dempsey et al. | 126/99 A |
| 4,653,466 A | 3/1987 | DeHaan et al. | 126/110 R |
| 4,899,726 A | 2/1990 | Waterman | 126/110 R |
| 5,301,654 A | 4/1994 | Weber, III et al. | 126/110 R |
| 5,341,795 A | 8/1994 | Chou et al. | 126/110 R |
| 5,347,958 A | 9/1994 | Gordon, Jr. | 122/20 B |
| 5,352,099 A * | 10/1994 | Anstine et al. | 417/366 |

(Continued)

FOREIGN PATENT DOCUMENTS

DE    195 18 076 A1    11/1996

(Continued)

Primary Examiner—Gregory Wilson
(74) Attorney, Agent, or Firm—Bromberg & Sunstein LLP

(57) ABSTRACT

A condensation removal apparatus is disclosed. The condensation removal apparatus is used with a hot water heater wherein the hot water heater produces a fuel exhaust. The fuel exhaust from the hot water heater is provided to a draft inducer through an inlet which includes a thermally conductive plate having a hole through which the fuel exhaust flows. The draft inducer mixes ambient air with the fuel exhaust and reduces the temperature of the mixture as compared to the fuel exhaust. The mixture is directed to an outlet of the draft inducer and through piping into another environment. As the mixture cools, condensation forms within the piping. The condensation drips back down through the draft inducer. The condensation is then directed onto the thermally conductive plate. Since the thermally conductive plate maintains a high temperature, the condensation is turned from a liquid form into a gaseous form and is directed back through the draft inducer to the outlet.

17 Claims, 3 Drawing Sheets

U.S. PATENT DOCUMENTS

| | | | |
|---|---|---|---|
| 5,375,651 A * | 12/1994 | Colwell ........................ | 165/47 |
| 5,620,302 A | 4/1997 | Garrison et al. ......... | 415/169.2 |
| 5,623,918 A | 4/1997 | Swilik, Jr. et al. ....... | 126/110 R |
| 6,398,512 B2 * | 6/2002 | Stewart ........................ | 417/53 |
| 6,622,660 B1 * | 9/2003 | Bajic et al. .............. | 122/13.01 |
| 7,052,271 B2 * | 5/2006 | Brown et al. ................ | 431/20 |

FOREIGN PATENT DOCUMENTS

| | | |
|---|---|---|
| DE | 197 14 531 A1 | 2/1998 |
| JP | 09 287831 A | 2/1998 |
| WO | WO 96/36840 | 11/1996 |
| WO | WO 2004/023041 A2 | 3/2004 |
| WO | WO 2005/024303 A1 | 3/2005 |

* cited by examiner

CONDENSATION REMOVAL FOR USE WITH A DRAFT INDUCER

CROSS REFERENCE TO RELATED APPLICATION

This patent application is a continuation of U.S. patent application Ser. No. 10/847,646, filed on May 17, 2004 now abandoned which is incorporated herein by reference in its entirety. This application is also a continuation-in-part of U.S. patent application Ser. No. 10/847,207 filed May 17, 2004 which is incorporated herein by reference in its entirety. This application is also a continuation-in-part of U.S. patent application Ser. No. 10/655,534, filed on Sep. 4, 2003 now U.S. Pat. No. 7,052,271, which in turn claims the benefits of U.S. provisional patent application No. 60/409,142, filed Sep. 9, 2002, and U.S. provisional patent application No. 60/499,844 filed on Sep. 3, 2003, all three of which are incorporated herein in their entirety, by reference.

TECHNICAL FIELD AND BACKGROUND ART

The present invention relates to condensation removal and specifically condensation removal in draft inducer.

Hot water heaters heat water in a tank by burning a fuel source, heating the tank, which transfers the thermal energy to the water, and thereby increases the water's temperature. As the fuel burns, the fuel produces a hot exhaust which is vented away from the hot water heater. In certain hot water heaters draft inducer are used to cool the exhaust. As the exhaust cools, a small amount of the exhaust condenses within either the draft inducer or the ventilation piping leading from the hot water heater. This condensation can then flow back into the draft inducer and the hot water heater. Over long periods of time, the buildup of condensation can cause corrosion and thus the deterioration of metal parts within the hot water heater and/or the draft inducer.

Prior art systems have designed special condensation traps to remove such condensation. This is both costly and also inconvenient. It is costly in that the manufacturer must design and create the condensation trap and incorporate the condensation routing into the design. Such designs are inconvenient for the home owner because the condensation will collect and the collection receptacle must be periodically emptied.

SUMMARY OF THE INVENTION

In a first embodiment of the invention there is provided a condensation removal apparatus. The condensation removal apparatus is used with a hot water heater wherein the hot water heater produces an exhaust. When a hot water heater heats hot water, a fuel is ignited and burned. This process causes the resulting fuel exhaust. The fuel exhaust is vented from the hot water heater through an outlet to a draft inducer. The draft inducer has an inlet for receiving the fuel exhaust. The inlet is formed by a hole in a thermally conductive plate. The hole may take the form of any shape. As the fuel exhaust passes through the hole, the plate is heated. The plate's temperature is raised by the exhaust such that the plate can turn condensation into a gaseous form. In one embodiment, the thermally conductive plate is convex in shape. The convex shape prevents any condensation that reaches the thermally conductive plate from reaching the hot water heater. In one embodiment, the hole is at the center of the plate. Any condensation that reaches the plate is turned into a gaseous state and is forced back out through the draft inducer.

The thermally conductive plate is sized to fit within the inlet of the draft inducer. The draft inducer includes a mixing chamber. The thermally conductive plate sits between the outlet of the hot water heater and the mixing chamber. The mixing chamber of the draft inducer includes one or more openings that allow ambient air to flow into the mixing chamber. An impeller situated above the mixing chamber draws ambient air into the mixing chamber, causing a vortex and mixing the fuel exhaust with the ambient air. The fuel exhaust and ambient air mixture is drawn through the impeller and redirected approximately ninety degrees. In one embodiment, the impeller is a backwards curved impeller. The backwards curved impeller is powered by a DC motor which resides within the impeller housing. As the ambient air mixes with the fuel exhaust the temperature of the mixture is reduced as compared to the fuel exhaust. The mixture is directed to an outlet of the draft inducer and through piping into another environment. As the mixture cools, condensation forms within the piping. The condensation drips back down through the draft inducer. The condensation is then directed onto the thermally conductive plate. Since the thermally conductive plate maintains a high temperature, the condensation is turned from a liquid form into a gaseous form and is directed back through the draft inducer to the outlet.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires: In the following disclosure the term "exhaust" shall refer to both the fuel exhaust that comes directly from the hot water heater, as well as, the ambient air and fuel exhaust mixture unless the context requires a different meaning.

Figure 1:
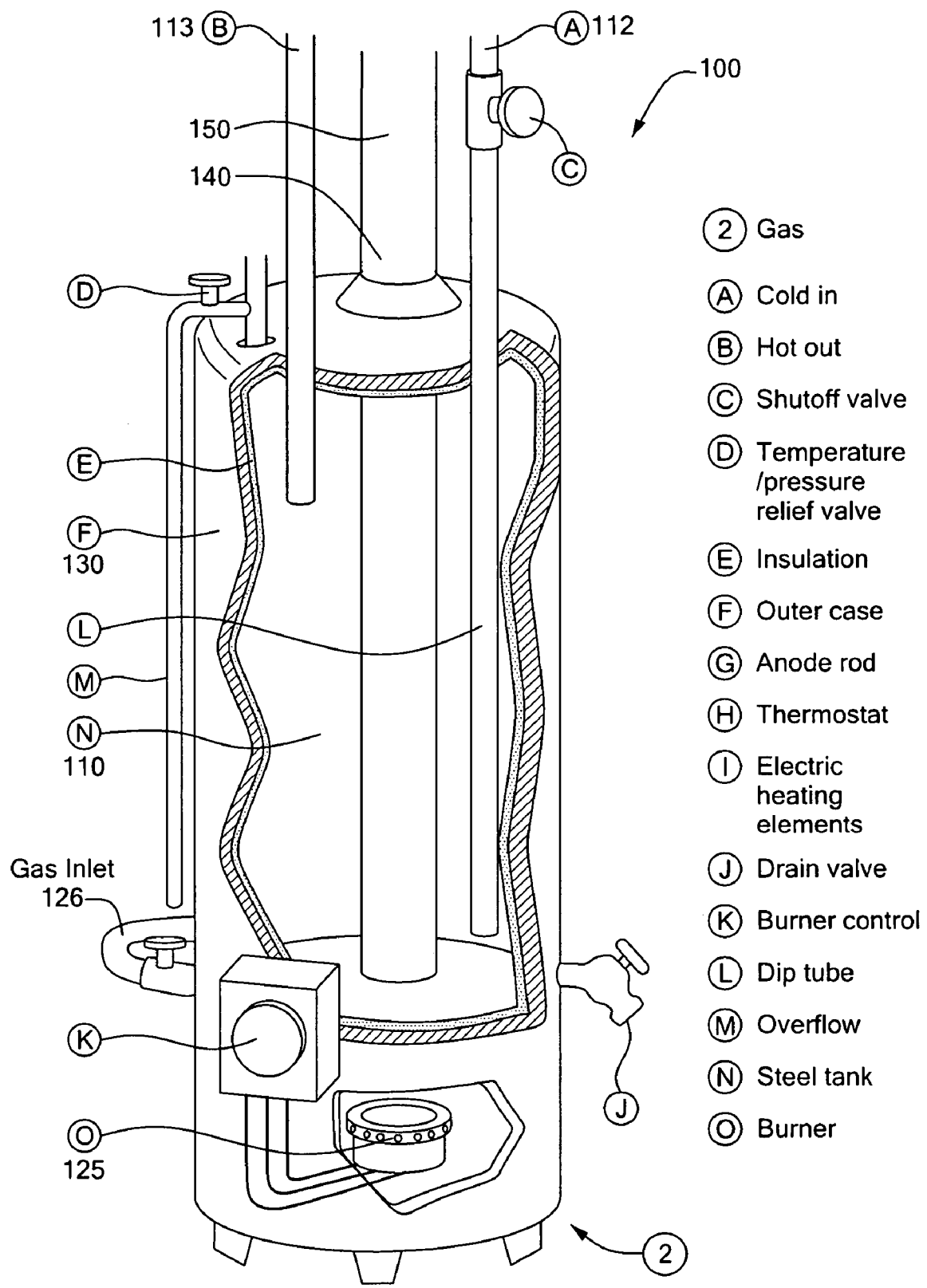
FIG. 1 is cut-away schematic diagram of a hot water heater.

FIG. 1 is schematic diagram of a hot water heater. A hot water heater 100 includes a tank 110 having an inlet 112 and an outlet 113. The inlet 112 allows unheated water to flow into the tank 110. The outlet 113 allows heated water to flow out of the tank 110. The hot water heater 100 also includes a fuel source 120 and an ignition device 125 for igniting and burning the fuel source. The water tank 110 along with the ignition device 125 and the fuel inlet 126 for the fuel source are encased in a housing 130. The heat from the ignited fuel source 120 heats the water tank 110 which thermally transfers its energy to the water increasing the water's temperature. During the burning of the fuel source 120, a fuel exhaust is produced. This fuel exhaust is the result of the byproduct of the burning fuel combined with the thermally warmed air. The fuel exhaust is vented to an outlet 140 which allows the fuel exhaust to flow to an exterior location outside of the housing 130 of the hot water heater 100. Since the fuel exhaust is extremely hot, usually in excess of 250 degrees Fahrenheit, the piping 150 that is used to couple to the outlet of the hot water heater needs to be made out of a material that can tolerate such temperatures, such as, iron and copper piping. Standard PVC (polyvinyl chloride) piping has a melting point which is less than that produced by the exhaust from a hot water heater. In order to use PVC piping as the venting material with a hot water heater, a draft inducer can be employed. The draft inducer allows ambient air to mix with the fuel exhaust causing the exhaust to decrease in temperature prior to the exhaust being vented through the PVC piping to an outside environment.

Figure 2:
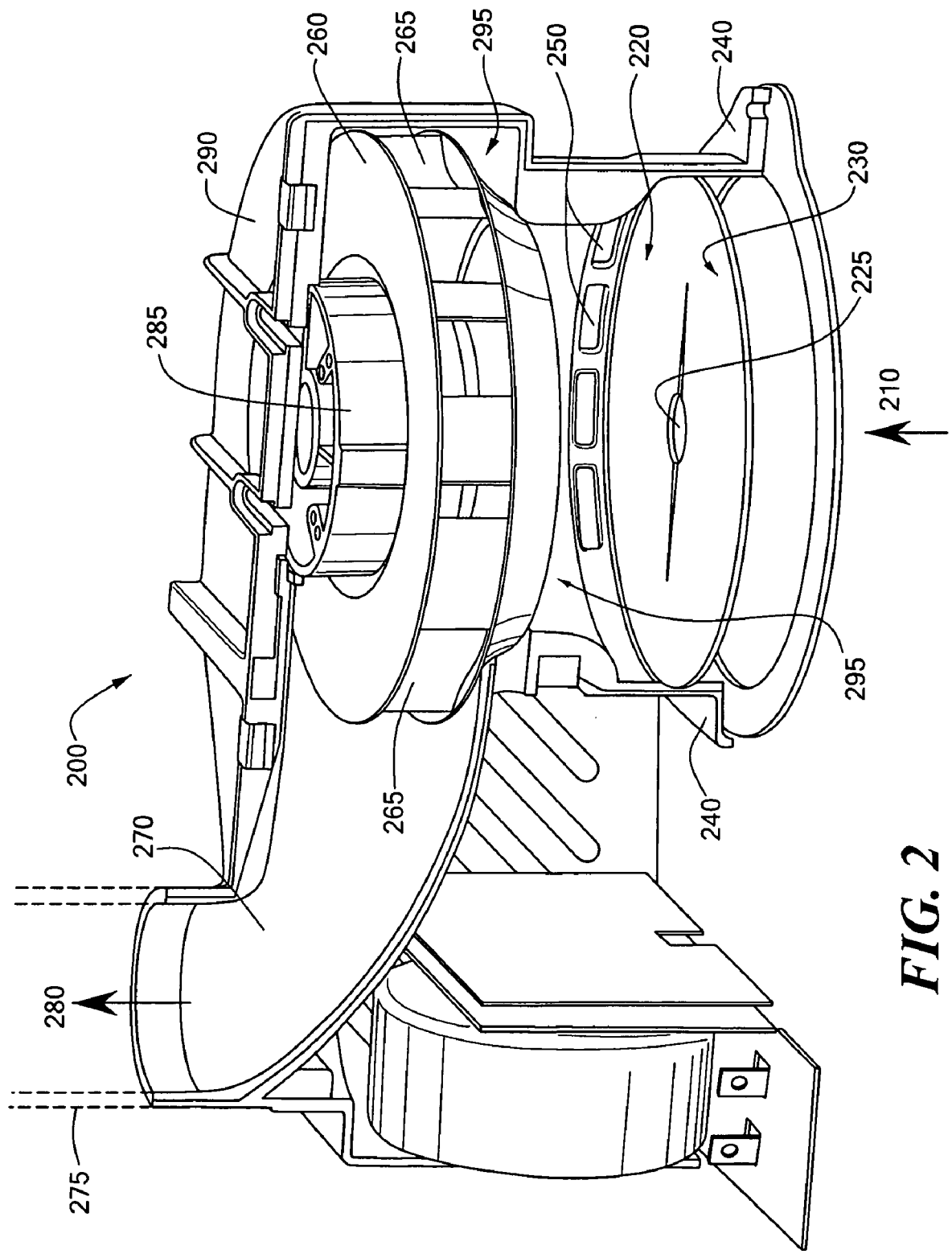
FIG. 2 shows a cut-away side view of a draft inducer.

FIG. 2 shows a side view of a draft inducer 200. The draft inducer 200 has a fuel exhaust inlet 210 which mounts to the hot water heater at the fuel exhaust outlet of the hot water heater from FIG. 1. The exhaust flows into the draft inducer 200 and enters a mixing chamber 220 through the fuel exhaust inlet 225. The inlet 225 is a slit or hole in a plate 230 that mates with the draft inducer housing 240. In the embodiment that is shown the plate 230 is circular in shape. Since the exhaust is a heated gas, the gas rises up through the slit 225 and into the mixing chamber 220. The mixing chamber 220 includes one or more openings 250 to the ambient air. In the present embodiment that is shown, the air inlets 250 are equally spaced rectangular cut-outs in the housing 240. The ambient air can flow into the mixing chamber 220 through the openings 250 in the housing 240 and mix with the exhaust. The slit 225 at the inlet of the mixing chamber 220 is sized so that only a small portion of the fuel exhaust is drawn into the mixing chamber at a given time and mixes with a substantially greater amount of ambient air in order to reduce the temperature of the exhaust. Thus, the ambient air/fuel exhaust mixture will have a lower temperature than that of the fuel exhaust that flows out of the hot water heater. In the process, the inlet plate 230 is heated by the exhaust on the inlet side of the plate. The plate will be heated to temperature that is equal to or in excess of the boiling point of water.

An impeller 260 having backwards curved blades 265 spins above the mixing chamber, drawing in the ambient air. The impeller 260 creates a vortex that mixes the ambient air with the fuel exhaust and draws the mixture up into the impeller blades 265. The impeller blades 265 spin in a circular motion and redirect the exhaust mixture approximately 90 degrees. The cooled exhaust is then directed by the impeller wheel to the outlet 270 of the draft inducer and into piping 275. The piping 275 carries the exhaust to an outlet 280. For example, the piping may terminate at the exterior to a home or building. In one embodiment, the piping may be PVC tubing.

Figure 3:
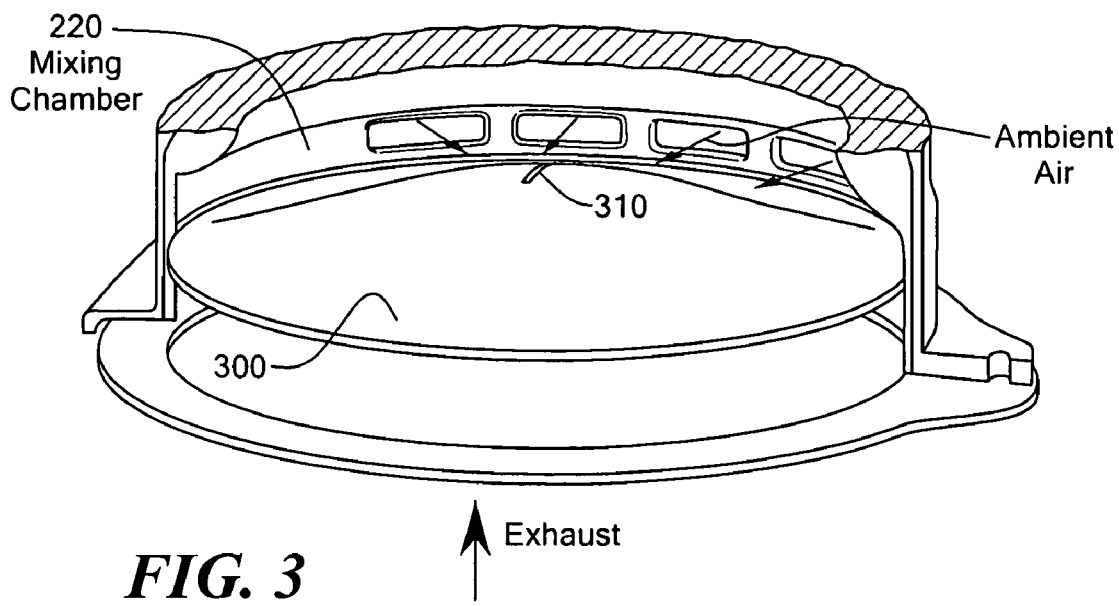
FIG. 3 shows an evaporation plate having a convex shape positioned at the inlet of a mixing chamber.

The impeller 260 of the draft inducer that is shown in FIG. 2 is powered by a DC motor 285. The DC motor 285 resides within the central housing of the impeller structure 290. The blades of the impeller 260 are coupled to the exterior surface of the impeller structure 290. By using backwards curved blades 265 and a DC motor 285, the motor can be of such a size so as to fit within the impeller structure. FIG. 3 shows the evaporation plate 300. The evaporation plate 300 has a small hole 310 through which the fuel exhaust flows through. The plate 300, in general heats up to between 250 degrees and 300 degrees during the burn cycle when water is being heated. In one embodiment, as shown in FIG. 3, the plate 300 is concave in shape, such that the hole through which the exhaust flows is at a higher point than the rest of the plate. This shape prevents the plate from allowing any condensation to drip back into the hot water heater. The evaporation plate 300 prevents condensation build-up, the need for a condensation tank, and the added piping that is required for directing the condensation to the condensation tank.

As the exhaust cools as the result of the draft inducer, a few drops of condensation form within the outlet piping. The condensation travels in a downward direction along the interior surface of the outlet piping and into the draft inducer eventually reaching the impeller section of the draft inducer. In one embodiment, the housing is formed with channels into which the condensation will flow. The condensation continues to drip downward along the interior housing surface of the draft inducer and is directed to the evaporation plate. Since the temperature of the evaporation plate is in excess of the boiling point of water, the condensation is turned from a liquid form back into a gaseous form and is directed back up through the impeller and to the outlet.

Returning to FIG. 2, the impeller section of the draft inducer is provided in a curved circular housing 295. The curvature of the housing 295 assists in directing the condensation onto the evaporation plate. It should be understood by one of ordinary skill in the art that the housing for the impeller may take any number of shapes without deviating from the intent of the presently described invention.

Figure 4:
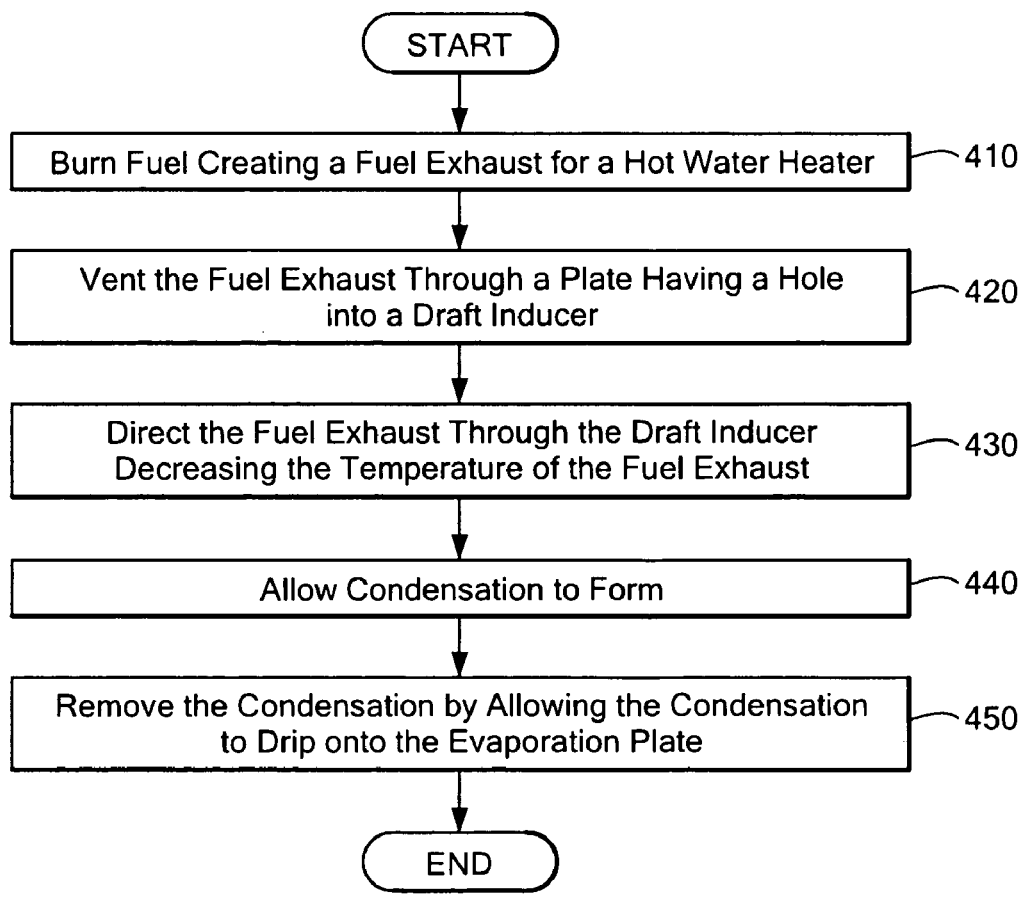
FIG. 4 is a flow chart explaining how the evaporation plate is used with a draft inducer.

FIG. 4 is a flow chart showing the methodology for removal of condensation using one embodiment of the invention. Unheated water is allowed to enter into an inlet of the hot water heater and fill the water tank if water is not already present within the tank. The fuel of the hot water heater is ignited by an ignition device. The fuel burns heating the tanking holding the water and creating a fuel exhaust (410). In one embodiment the fuel is gas, in other embodiments the fuel may be oil or another fuel source. The fuel exhaust is vented outside of the hot water heater and is provided to the inlet of a draft inducer. A hole within a plate at the inlet of the draft inducer allows the fuel exhaust to vent into a mixing chamber (420). The temperature of the plate is increased by the exhaust to a temperature capable of turning exhaust in a liquid state into a gaseous state. The fuel exhaust is directed through the draft inducer (430). The fuel exhaust mixes with ambient air in a mixing chamber and passes through a spinning impeller reducing the temperature of the exhaust. As the temperature decreases, condensation is formed within the outlet piping from the draft inducer (440). The condensation drips back down into the draft inducer due to gravity. The condensation which is the fuel exhaust in a liquid state drips onto the evaporation plate (450). The condensation changes from a liquid form into a gaseous form and is vented to an outside environment.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A condensation removal apparatus for use with a hot water heater producing exhaust, the apparatus comprising:
   a draft inducer;
   a thermally conductive plate having an exhaust generating side and a draft inducer side, the plate having a hole therethrough allowing exhaust from the hot water heater to pass through the hole from the exhaust generating side to the draft inducer side, the plate being convex in shape such that the condensation flows away from the hole, the exhaust heating the thermally conductive plate to a temperature capable of converting the exhaust in liquid form to a gaseous form, the plate situated between an exhaust outlet of the hot water heater and the draft inducer.

2. The condensation removal apparatus according to claim 1 wherein the draft inducer has an inlet sized for receiving the thermally conductive plate.

3. The condensation removal apparatus according to claim 1 wherein the draft inducer includes a mixing chamber for mixing ambient air with exhaust and wherein the thermally conductive plate forms the inlet to the mixing chamber.

4. The condensation removal apparatus according to claim 1, further comprising:
a vent inlet in fluid communication with the draft inducer and the hot water heater.

5. The condensation removal apparatus according to claim 1, further comprising:
a vent outlet in fluid communication with the draft inducer for venting the exhaust to an environment.

6. The condensation removal apparatus according to claim 1, wherein the draft inducer includes a backwards curved impeller.

7. The condensation removal apparatus according to claim 6, wherein the draft inducer includes a motor for rotating the backwards curved impeller, wherein the motor resides within the backwards curved impeller.

8. The condensation removal apparatus according to claim 7 wherein the backwards curved impeller spins about an axis that is substantially the same as the direction of gravity.

9. The condensation removal apparatus according to claim 8, wherein the backward curved impeller expels the exhaust at a direction that is substantially perpendicular to the direction that the exhaust enters the backward curved impeller.

10. The condensation removal apparatus according to claim 9, wherein the backward curved impeller resides in a housing having curved sides allowing condensation to be directed onto the thermally conductive plate.

11. A method for removal of condensation resulting from exhaust from a hot water heater, the method comprising:

burning a fuel to heat water within the hot water heater creating a fuel exhaust;

venting the fuel exhaust through a hole within a plate thereby heating the plate to a temperature capable of transforming fuel exhaust in a liquid state to a gaseous state;

directing the fuel exhaust through a draft inducer reducing the temperature of the fuel exhaust and turning a portion of the fuel exhaust into a liquid state; and evaporating any fuel exhaust in a liquid state when the fuel exhaust in a liquid state drips onto the plate.

12. The method according to claim 11, wherein directing the fuel exhaust through the draft inducer includes mixing the fuel exhaust with ambient air.

13. The method according to claim 11, further comprising:
directing the fuel exhaust in a liquid state into troughs on the interior of the draft inducer toward the plate.

14. The condensation removal apparatus according to claim 1, wherein the hole comprises a slit.

15. The method according to claim 11, wherein the hole comprises a slit.

16. The method according to claim 11, wherein the plate is convex in shape such that the fuel exhaust in a liquid state that drips onto the plate flows away from the hole.

17. A condensation removal apparatus for use with a hot water heater producing exhaust, the apparatus comprising:
a draft inducer; and
a thermally conductive plate having an exhaust generating side and a draft inducer side, the plate having a hole therethrough allowing exhaust from the hot water heater to pass through the hole from the exhaust generating side to the draft inducer side, the exhaust heating the thermally conductive plate to a temperature capable of converting the exhaust in liquid form to a gaseous form, the plate situated between an exhaust outlet of the hot water heater and the draft inducer;
the draft inducer including a housing formed with channels to direct condensation to the plate.

* * * * *